P. KONOPSKI.
TROLLEY HARP.
APPLICATION FILED NOV. 2, 1918.
1,370,126.
Patented Mar. 1, 1921.
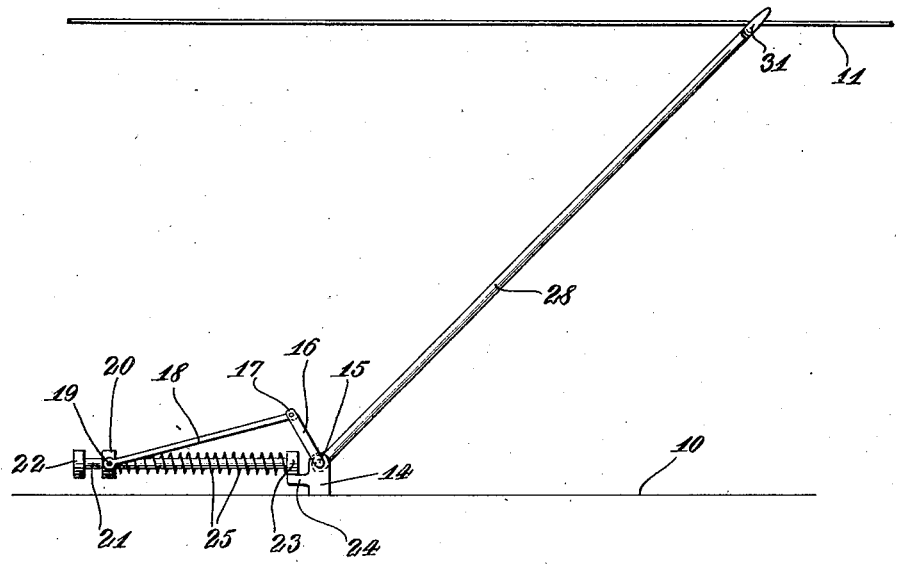
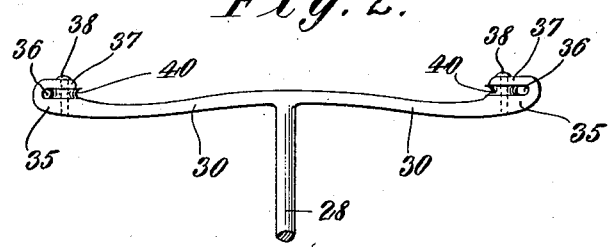
INVENTOR.
Pawlo Konopski.
BY
his ATTORNEY.

UNITED STATES PATENT OFFICE.

PAWLO KONOPSKI, OF TORONTO, ONTARIO, CANADA.

TROLLEY-HARP.

1,370,126.     Specification of Letters Patent.     Patented Mar. 1, 1921.

Application filed November 2, 1918. Serial No. 260,766.

*To all whom it may concern:*

Be it known that I, PAWLO KONOPSKI, a a subject of the Emperor of Austria, residing at Toronto, Province of Ontario and Dominion of Canada, have invented certain new and useful Improvements in Trolley-Harps, of which the following is a specification.

This invention relates to improvements in devices for conducting a current of electrical energy from a trolley wire to a vehicle adapted to be actuated by the current therefrom.

The principal object of the invention is to provide a contactor which is maintained at all times in intimate engagement with a trolley wire, irrespective of curves, crossovers or other changes of direction taken by the vehicle relative to the trolley wire.

This and other like objects of a similar nature are attained by the novel construction and combination of parts hereinafter described and shown in the accompanying drawing, forming a material part of this disclosure and in which—

Figure 1 is a side elevational view indicating the application of the invention.

Fig. 2 is a like view showing a further modification in the contacting elements.

Referring to the drawing, particularly Fig. 1, the numeral 10 indicates conventionally the top of a vehicle or car, and 11 designates the trolley wire from which current is taken. Firmly attached upon the top of the car is a bracket 14, in which is rotatably engaged a short spindle 15 having extending short levers 16 pivotally engaged by the pin 17 with a pair of links 18, in turn pivoted on pins 19 to a collar 20, slidably engaged upon a horizontal bar 21 provided with a stop, or limiting head 22 at its outer end, the inner end of the bar engaged in a projection 23 formed with an arm 24 extending from the fixed bracket 14.

Encircling the rod 21 is a coiled compression spring 25, one end abutting against the lug 23, while the other end presses against the sliding collar 20, normally maintaining the links 18 in an extended position.

Also fixed upon the spindle 15 is an arm or pole 28.

As shown in Fig. 2, the extended arms 30 are formed with enlarged ends 35, containing slots 36, the upper elements 37 extending inwardly and having drilled through them openings receptive of the headed pins 38, upon which are journaled grooved rollers 40, free to rotate within the slots or recesses 36. Should the wire approach the ends of the bar it will make contact with the rollers, presenting a smooth contact thereto, avoiding abrasion of the trolley wire, and effectively guiding the pole head and preventing it from becoming separated from the trolley wire.

Having thus explained the construction and operation of the invention, what I claim as new and desire to secure by Letters Patent, is—

A contact device for an overhead conductor comprising in combination with an inclined trolley pole, a transverse bar on said pole, enlarged and slotted ends on said bar, said ends extending inwardly, headed pins passed through the inwardly extending ends into said enlarged ends, grooved rollers journaled on said pins free to rotate within the slots of said bar ends, substantially as described and for the purpose set forth.

In testimony whereof I have affixed my signature.

PAWLO KONOPSKI.